(12) United States Patent
Kato et al.

(10) Patent No.: US 8,429,886 B2
(45) Date of Patent: Apr. 30, 2013

(54) ROTARY CUTTER FOR MOWER

(75) Inventors: Hiroki Kato, Tokyo (JP); Tetsuya Yamada, Tokyo (JP)

(73) Assignee: Starting Industrial Co., Ltd. (JP)

( * ) Notice: Subject to any disclaimer, the term of this patent is extended or adjusted under 35 U.S.C. 154(b) by 49 days.

(21) Appl. No.: 12/920,445

(22) PCT Filed: Feb. 27, 2009

(86) PCT No.: PCT/JP2009/053703
§ 371 (c)(1),
(2), (4) Date: Aug. 31, 2010

(87) PCT Pub. No.: WO2009/110385
PCT Pub. Date: Sep. 11, 2009

(65) Prior Publication Data
US 2011/0005185 A1    Jan. 13, 2011

(30) Foreign Application Priority Data

Mar. 5, 2008   (JP) ................. 2008-054853
Jul. 25, 2008   (JP) ................. 2008-192573

(51) Int. Cl.
*A01D 34/416* (2006.01)
(52) U.S. Cl.
USPC ................. 56/12.7; 30/276; 30/347
(58) Field of Classification Search ........... 56/12.7; 30/276, 347; D8/8
See application file for complete search history.

(56) References Cited

U.S. PATENT DOCUMENTS

| 4,134,204 | A  | * | 1/1979 | Perdue ............ 30/276 |
| 4,672,798 | A  |   | 6/1987 | Ota |
| 4,813,140 | A  | * | 3/1989 | Calcinai .......... 30/276 |
| 4,942,664 | A  | * | 7/1990 | Zatulovsky ....... 30/276 |
| 7,017,272 | B2 | * | 3/2006 | Grace .......... 30/275.4 |
| 7,412,768 | B2 | * | 8/2008 | Alliss ............ 30/276 |
| 2004/0134078 | A1 |  | 7/2004 | Pfaltzgraff |

FOREIGN PATENT DOCUMENTS

| JP | 63-216406 | 9/1988 |
| JP | 069420 | 2/1994 |
| JP | 2509199 | 6/1996 |
| JP | 2005-124501 | 5/2005 |

* cited by examiner

*Primary Examiner* — Alicia Torres
(74) *Attorney, Agent, or Firm* — Gerald E. Hespos; Michael J. Porco; Matthew T. Hespos (57) ABSTRACT

A rotary cutter for a mower has a cord for cutting grass and the like by rotating itself; a reel for housing the cord and feeding the cord while intermittently rotating; a case for housing the reel; a cover for covering the case; and a pressing body protruding from the case. The pressing body is axially movable by being pressed, and intermittently rotating the reel. The reel and the pressing body are integrally constructed. Concave grooves for inserting the cord are provided in the reel in a radial direction and the cord is wound by fitting it to the concave grooves.

5 Claims, 6 Drawing Sheets

ROTARY CUTTER FOR MOWER

BACKGROUND OF THE INVENTION

1. Field of the Invention

The present invention relates to a rotary cutter for a mower used for mowing grass, lawn, and the like with a cord (principally made of nylon) extending in a radial direction of a case which is rotationally-driven by power of a motor or the like by way of an axis of rotation.

2. Description of the Related Art

As this type of rotary cutter, it is conventionally known a rotary cutter having a reel which houses a nylon cord, wherein when the cord is worn away, the cord is let out from the reel by pressing the cutter on the ground during rotation, by tapping the cutter or by running up the rotation of the cutter. As to this type of rotary cutter, when the cord housed in the reel was worn out, it was necessary to take out the reel by disassembling the rotary cutter, and wind a new cord, and then rearranging its components again. However, by such a way, it is very troublesome and inconvenient to carry out such procedures during mowing. Moreover, when the rotary cutter is disassembled and the reel is taken out, it has been feared that these components may be lost since associated components of the reel and other components are taken out at the same time. On this account, as the rotary cutter in which a cord replacement can be simplified when the cord is worn away, or, the rotary cutter in which the cord is replaceable without disassembling the rotary cutter itself, for example, a rotary cutter in which through-holes are formed in a part of a cylindrical body (a cord-winding part) of a reel, and the cord is inserted through the through-holes and wound onto the cylindrical body of the reel, is suggested (see Patent Documents 1 to 3).

Patent Document 1: Utility model registration No. 2,509,199
Patent Document 2: Japanese Patent Laid-Open No. 2005-124501
Patent Document 3: Published Japanese Translation of a PCT Application 2006-514837

In the case of the conventional rotary cutter as claimed in Patent documents 1 to 3, there is an advantage that the cord is replaceable without disassembling the rotary cutter and taking out the reel. However, for example, in the case of a rotary cutter described in Patent document 1, there are some drawbacks that it is necessary to provide a cord through-hole formed between an outer circumferential surface and an inner circumferential surface of a cylindrical body of a reel (a cord-winding part) of a reel, the cord through-hole being perpendicular to an axis of rotation without providing on the inner circumferential surface, so that top and bottom positions of its cord insertion opening and a guiding hole can be on the same horizontal plane. As a result, production/processing cannot be easily carried out in order to form its cord through-hole and the guiding hole. Therefore, the production cost of such a rotary cutter can be relatively high. Moreover, a rotary cutter described in Patent document 2 has a structure that a cord is sorted into upper and lower of two layers of a reel and is wound on the reel, and cord insertion holes are formed to sort the cord into up and down at a part of its partition. Therefore, such a rotary cutter has some drawbacks that the structure of the reel is relatively complicated; a lot of time and effort are needed for its production/processing; and the production cost of such a rotary cutter can be relatively high. In the case of the rotary cutter described in Patent document 3, the rotary cutter is comprised of two components of a cylindrical securement head having a reel at its shaft core, and a spool (a cord-winding part) mounted to the securement head. The spool, which is similar to that of the rotary cutter described in Patent document 2, has a structure that a cord is sorted into up and down and is wound thereon, and cord insertion holes are formed to sort the cord into up and down at a part of its partition through the spool and the securement head.

Therefore, the rotary cutter of Patent document 3 has some drawbacks that the structure of the reel is more complicated; much more time and effort are needed for its production/processing; and the production cost of such a rotary cutter can be higher. Further, in the case of the conventional rotary cutter as claimed in Patent documents 1-3, there is a common drawback that the insertion/conduction operation of the cord when the cord is wound on the reel requires time and effort.

The object of the present invention is to overcome the drawbacks of the above-described conventional rotary cutter, and to realize a rotary cutter in which its production/processing is simple and the production cost is inexpensive, having no possibility of losing associated components of a reel and other components when replacing a cord, and allowing the cord to be easily and quickly wound up.

SUMMARY OF THE INVENTION

According to a rotary cutter for a mower related to the present invention, a reel and a pressing body are integrally constructed, and a concave-grooves fitting method has been adopted instead of a conventional insertion method as a cord-winding mechanism to the reel. The rotary cutter for a mower is comprised of a cord for cutting grass and the like by rotating itself; a reel for housing the cord and feeding the cord while intermittently rotating; a case for housing the reel; a cover for covering the case; and a pressing body protruding from the case, being axially movable by being pressed, and intermittently rotating the reel. Further, the rotary cutter is characterized in that the reel and the pressing body are integrally constructed therein; concave grooves for inserting the cord are provided in the reel in a radial direction; and the cord is wound by fitting it to the concave grooves.

Moreover, in accordance with a preferred embodiment of the rotary cutter for a mower of this invention, at least one resilient element is axially mounted between the reel and the case; the reel and the pressing body are integrally constructed via/by way of the case; at least one resilient element is axially mounded between the case and the pressing body; and at least one resilient element is axially mounted, respectively between the reel and the cover and between the case and the pressing body. In addition, a spring or rubber is generally used as the resilient element.

In another embodiment of the rotary cutter for a mower of the present invention, instead of integrating the reel and the pressing body, the reel and the pressing body are separately constructed and each of them can be separately and axially moved. Further, the rotary cutter is characterized in that the reel and the pressing body are separated; the pressing body is mounted detachably on the case; at least two springs, one of which is a spring outwardly biasing the pressing body and the other is a spring biasing the reel toward the side of the case, are axially mounted in the rotary cutter; and the reel and the pressing body are separately and resiliently supported, respectively. Moreover, in accordance with a preferred embodiment of this rotary cutter for a mower, a retainer, which is integral with or separates from the pressing body, is provided between the pressing body and the case. In accordance with another preferred embodiment, concave grooves for inserting the cord are provided in the reel in a radial direction.

According to the above-mentioned two kinds of the rotary cutter for a mower of the present invention, the preferred aspects are that projections for preventing from uplifting the cord are provided on the inner wall of the concave grooves for inserting the cord, or, a shape of openings of the concave grooves for inserting the cord is formed into a hook/aduncate shape.

According to a rotary cutter for a mower related to the present invention, in which the reel and the pressing body are integrally constructed, there is no possibility of losing associated components of a reel and other components when replacing a cord, and a concave-grooves fitting method has been adopted instead of a conventional insertion method as a cord-winding mechanism to the reel, thus the cord is wound by inserting and fitting itself to the concave grooves for inserting the cord provided in the reel. As a result, it is possible to easily and quickly insert the cord and also quickly and positively wind up the cord to the reel. In accordance with a further aspect, structurally, there is a small number of items of components, its production/processing is simple, and the production cost is inexpensive.

According to a rotary cutter for a mower in which the reel and the pressing body are separately constructed, like the above-mentioned rotary cutter for a mower, there is no possibility of losing associated components of a reel and other components when replacing a cord, and structurally there is a small number of items of components, so its production/processing is simple, and the production cost is inexpensive. Furthermore, especially when replacing a cord, it is possible to wind up the cord to the reel easily, quickly and positively, since the pressing body can be rotated without moving up and down. Still further, like the above-mentioned rotary cutter for a mower, it is possible to insert the cord easily and quickly to the reel by the addition of an advantageous effect of concave grooves for inserting the cord.

According to the above-mentioned two kinds of the rotary cutter for a mower of the present invention, it is possible to prevent the cord from uplifting/deviating from the reel and to stably and positively wind up the cord when winding up the cord to the reel, by providing projections for preventing from deviating the cord on the inner wall of the concave grooves for inserting the cord, or, by forming a shape of openings of the concave grooves for inserting the cord into a hook/aduncate shape.

BRIEF DESCRIPTION OF DRAWINGS

FIG. 1 to FIG. 3 show the first embodiment of a rotary cutter for a mower of the present invention.

FIG. 9 and FIG. 10 show the seventh embodiment of the rotary cutter of the present invention.

DETAILED DESCRIPTION OF THE PREFERRED EMBODIMENTS

Figure 1:
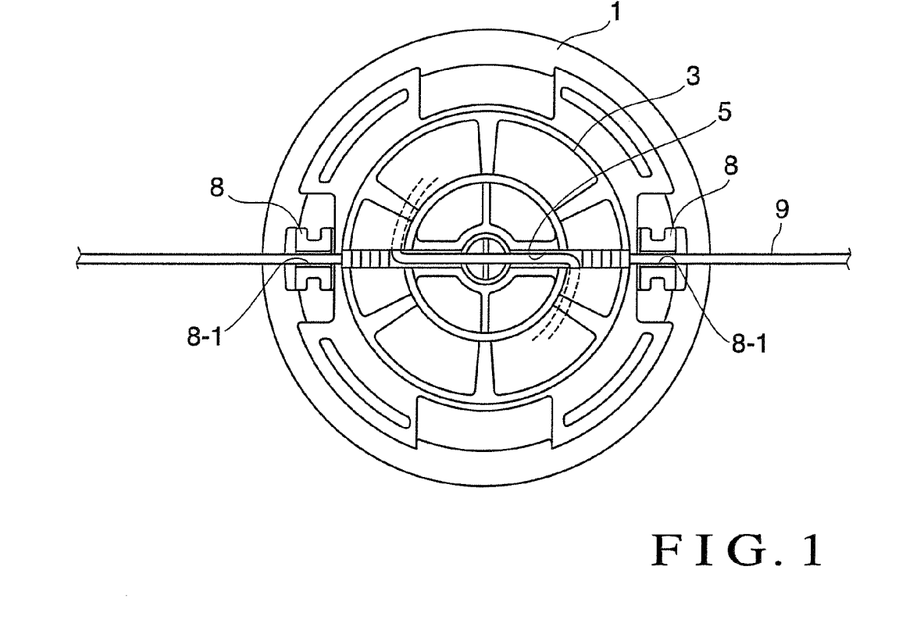
FIG. 1 is a top plane view of the first embodiment of the rotary cutter with a cover removed.
Figure 2:
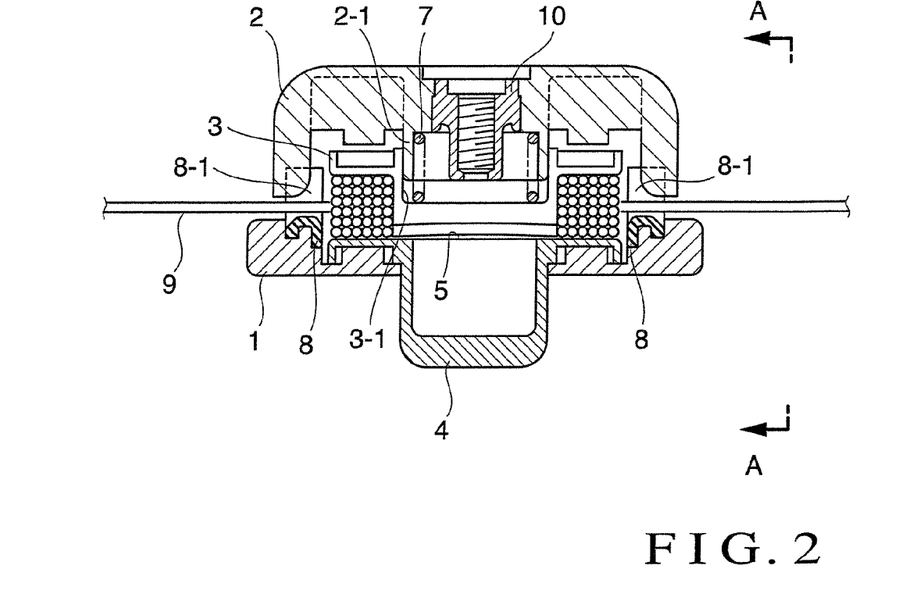
FIG. 2 is a vertical cross-sectional view of the rotary cutter covered with a cover.
Figure 3:
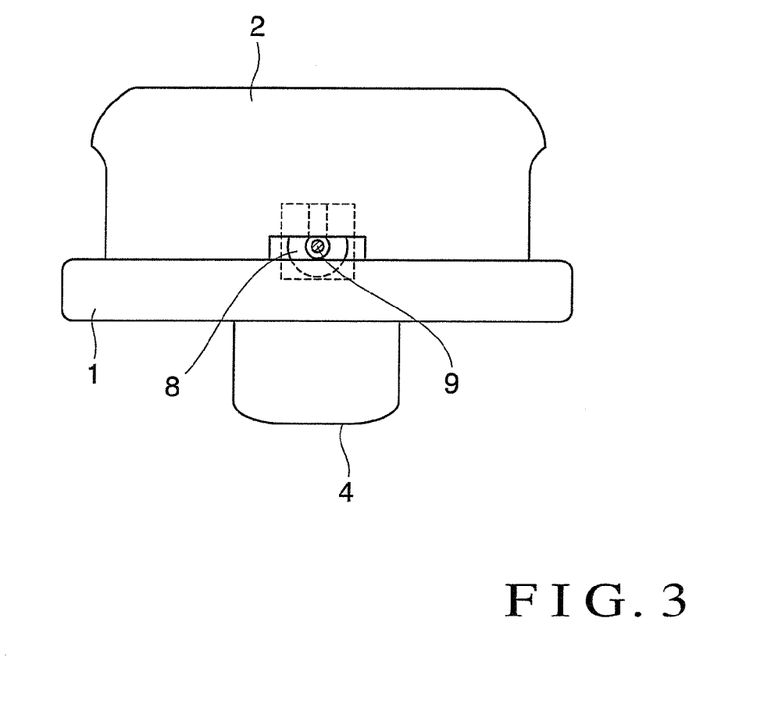
FIG. 3 is a view of FIG. 2 that is looked from a line A-A.

Reference is now made to the structure of the first embodiment of the rotary cutter for a mower of the present invention shown in FIG. 1 to FIG. 3. In the first embodiment of the rotary cutter for a mower, the cord is fed by bumping the rotary cutter (a pressing body). The rotary cutter has a structure that a reel 3 constructed integrally with a pressing body 4 which has a bottomed cylindrical shape, is mounted in the middle of a case 1 so that the pressing body 4 projects downwardly of the case 1; cord guides 8 are provided at a peripheral edge of the case 1; a cylindrical member 2-1 which projects in the central part of an inside of a cover 2 is detachably engaged to a circular recess 3-1 formed in the middle of the reel 3; and the cover 2 and the reel 3 are resiliently and mutually supported by a spring 7 which is located between the circular recess 3-1 and the cylindrical member 2-1.

Moreover, concave grooves 5 for inserting the cord are formed in a diametrical direction through the center of the reel onto the top side of the reel 3 constructed integrally with the pressing body 4 having a bottomed cylindrical shape. The cord guides 8 are formed in the same straight line with this concave grooves 5 for inserting the cord and mounted to the case 1. Each of the cord guides 8 has a concave groove 8-1 in the middle having the substantially same width as a concave groove 5 for inserting the cord.

The rotary cutter for a mower has a structure that the case 1 and the reel 3, and the reel 3 and the cover 2 are respectively engaged by a concave-convex fitting, and the pressing body 4 is pushed inwardly by bumping the pressing body 4 against the ground. Accordingly, the engagement between the case 1 and the reel 3 is uncoupled and then reel 3 rotates to feed the cord 9 wound on the reel 3 is fed (paid out). At the same time, the reel 3 pushed inwardly engages with the cover 2 and then a rotation once stops. Then the reel 3 returns to an original position by resilience of the spring 7, and then engages with the case 1 again and fixed. Reference number 10 stands for a nut member for connecting a drive rotary shaft (not shown) such as motors firmly fixed to the center of the cover 2.

According to the rotary cutter for a mower having constitutions shown in the above-mentioned FIG. 1 to FIG. 3, in replacing a cord when it is worn out, both the spring 7 and the cover 2 detachably engaged with the reel 3 constructed integrally with the pressing body 4 which has a bottomed cylindrical shape, are removed, and then a portion which is located in the central part of a long and new cord having a desired length, is fitted and placed to the concave grooves 5 for inserting a cord formed to the empty reel 3 which is engaged with the case 1 and to the concave grooves 8-1 on the cord guide 8 formed in the same straight line with this concave grooves 5 for inserting the cord from the top of these grooves, while making both ends of the cord respectively stick out from the cord guides only at a suitable length. In such conditions, a portion of the pressing body 4 having a bottomed cylindrical shape, which is integrally constructed with the reel 3, is gripped and the reel is rotated manually so that the cord 9 can be wound to the reel 3.

In replacing a cord of the above-mentioned rotary cutter for a mower, there is little possibility of losing components of the rotary cutter, since, as described above, only the cover 2 and the spring 7 have to be removed without the need to remove other components. Moreover, it is possible to insert and wind up the cord to the reel easily and quickly since the cord can be wound with the reel 3 fixed to the case 1 after inserting and fitting a new cord to concave grooves for inserting the cord which are formed in the reel.

Figure 4:
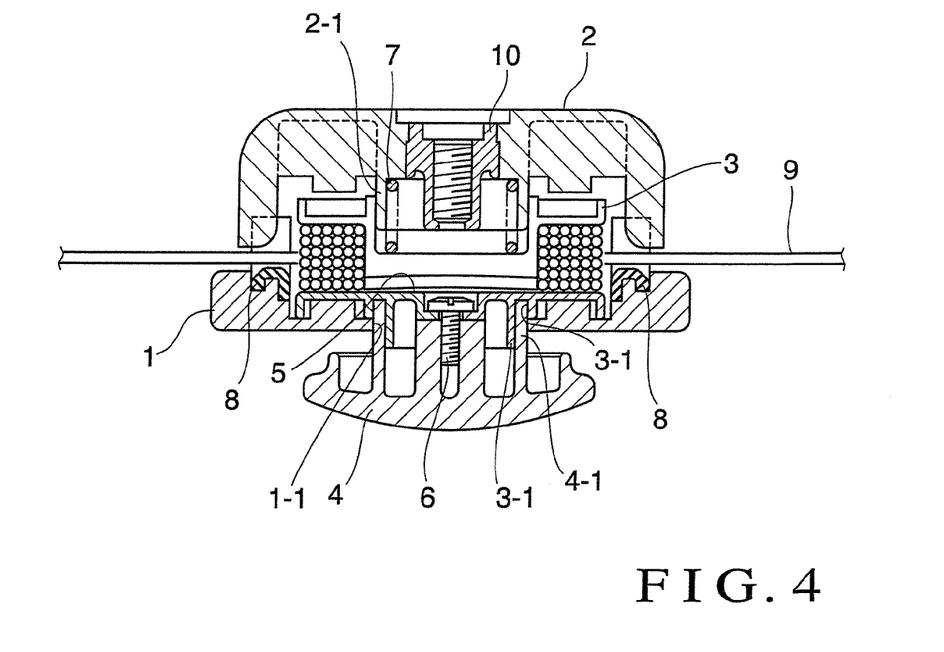
FIG. 4 is a vertical cross-sectional view of the second embodiment of the rotary cutter of the present invention, covered with a cover.

Next, reference is now made to the structure of the second embodiment of the rotary cutter for a mower of the present invention shown in FIG. 4. The structure of this rotary cutter is almost the same as that of the rotary cutter shown in FIG. 1, except that it has a structure that the reel 3 and the pressing body 4 are separately formed and then connected with a screw with the case 1 sandwiched. In the second embodiment of the rotary cutter for a mower, a part of a concave portion 3-1 formed in a bottom face of the reel 3 is outwardly protruded into a through-hole 1-1 opened in the central part of the case 1, and a bottomed cylindrical portion 4-1 of the pressing body 4 is engaged to this part of the concave portion 3-1, axially slidably and rotatably by a concavo-convex fitting. Then, the reel 3 and the pressing body 4 are integrally constructed by connecting the connection/abutment of each of the central parts of the reel 3 and the pressing body 4 with a connecting screw 6. In addition, the reason why the reel 3 and the pressing body 4 are separately formed and then integrally constructed with the screw, is that the case 1, the reel 3 and the pressing body 4 do not separate into pieces when replacing the cord.

According to the rotary cutter for a mower having constitutions shown in the above-mentioned FIG. 4, in replacing a cord when it is worn out, like the rotary cutter of the above first embodiment, both the spring 7 and the cover 2 detachably engaged with the reel 3, are removed, and then a portion which is located in the central part of a long and new cord having a desired length, is fitted and placed to the concave grooves 5 for inserting a cord formed to the empty reel 3 which is engaged with the case 1 and to the concave grooves 8-1 on the cord guide 8 formed in the same straight line with this concave grooves 5 for inserting the cord from the top of these grooves, while making both ends of the cord respectively stick out from the cord guides only at a suitable length. In such conditions, a portion of the pressing body 4, which is connected to the reel 3 with the screw, is gripped and the reel is rotated manually so that the cord 9 can be wound to the reel 3.

Also, in replacing a cord of the above-mentioned rotary cutter for a mower, there is little possibility of losing components of the rotary cutter, since, as described above, only the cover 2 and the spring 7 have to be removed. Moreover, it is possible to insert and wind up the cord to the reel easily and quickly because the cord can be wound with the reel 3 fixed to the case 1 after inserting and fitting a new cord to concave grooves for inserting the cord which are formed in the reel.

Figure 5:
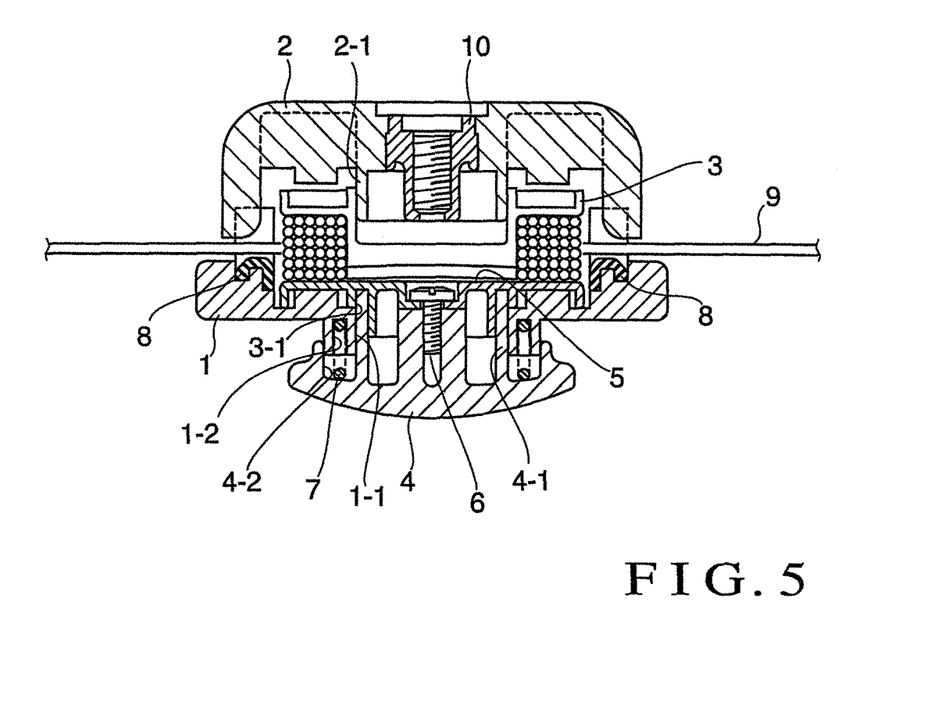
FIG. 5 is a vertical cross-sectional view of the third embodiment of the rotary cutter of the present invention, covered with a cover.

Next, reference is now made to the structure of the third embodiment of the rotary cutter for a mower of the present invention shown in FIG. 5. The structure of this rotary cutter is almost the same as that of the rotary cutter shown in FIG. 4, except that it has a structure that the position for attaching the spring 7, which is to axially and resiliently support the pressing body 4, is between the pressing body 4 and the case 1. In the third embodiment of the rotary cutter for a mower, a part of a concave portion 3-1 formed in a bottom face of the reel 3 is outwardly protruded into a through-hole 1-1 opened in the central part of the case 1, and a bottomed cylindrical portion 4-1 of the pressing body 4 is engaged to the part of the concave portion 3-1, axially slidably and rotatably by a concavo-convex fitting. Then, the spring 7 is attached between an annular concave groove 1-2, which projects at an outer circumferential portion of the through-hole 1-1 opened in the central part of the case 1, and an annular concave groove (4-2) formed in the inside of the pressing body 4, and the pressing body 4 is resiliently supported in the axial direction. Then, the reel 3 and the pressing body 4 are integrally constructed by connecting the connection/abutment of each of the central parts of the reel 3 and the pressing body 4 with a connecting screw 6.

According to the rotary cutter for a mower having constitutions shown in the above-mentioned FIG. 5, in replacing a cord when it is worn out, like the rotary cutter of the above second embodiment, the cover 2 detachably engaged with the reel 3 is removed, and then a portion which is located in the central part of a long and new cord having a desired length, is fitted and placed to the concave grooves 5 for inserting a cord formed to the empty reel 3 which is engaged with the case 1 and to the concave grooves 8-1 on the cord guide 8 formed in the same straight line with this concave grooves 5 for inserting the cord from the top of these grooves, while making both ends of the cord respectively stick out from the cord guides only at a suitable length. In such conditions, a portion of the pressing body 4, which is connected to the reel 3 with the screw, is gripped and the reel is rotated manually so that the cord 9 can be wound to the reel 3.

In replacing a cord of the above-mentioned rotary cutter for a mower having the constitution shown in FIG. 5, there is no possibility of losing any components of the rotary cutter, since only the cover 2 has to be removed without the need to remove the spring 7. Moreover, as described above, it is possible to insert and wind up the cord to the reel easily and quickly since the cord can be wound with the reel 3 fixed to the case 1 after inserting and fitting a new cord to concave grooves for inserting the cord which are formed in the reel.

Figure 6:
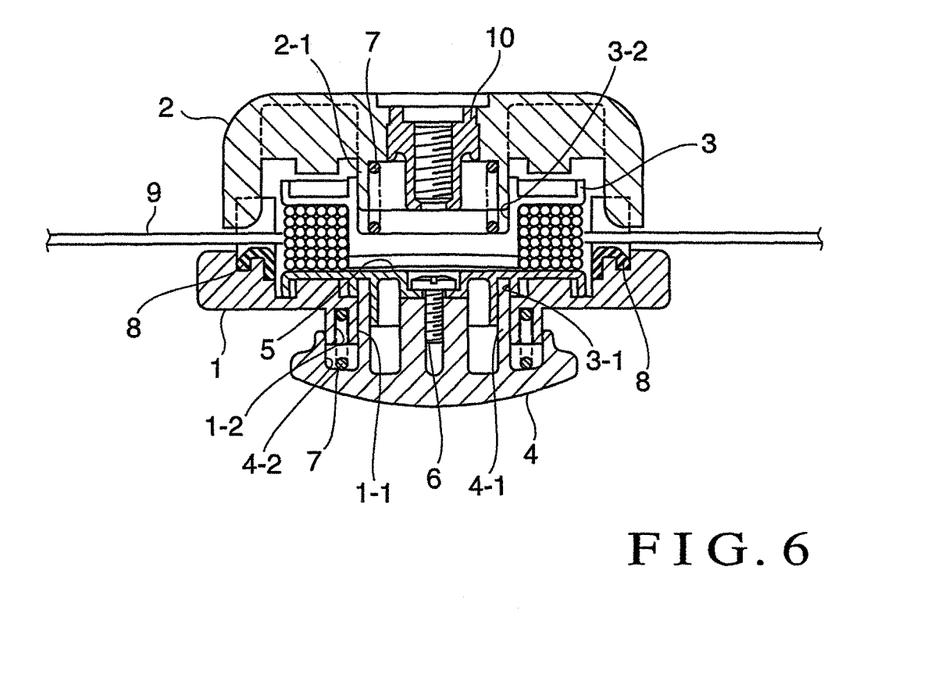
FIG. 6 is a vertical cross-sectional view of the fourth embodiment of the rotary cutter of the present invention, covered with a cover.

Next, reference is now made to the structure of the fourth embodiment of the rotary cutter for a mower of the present invention shown in FIG. 6. The structure of this rotary cutter is almost the same as that of the rotary cutter shown in FIG. 5, except that it has a structure that the positions for attaching springs 7 to axially and resiliently support the pressing body 4, are two places of between the cover 2 and the reel 3 and between the case 1 and the pressing body 4. In the fourth embodiment of the rotary cutter for a mower, the cover 2 and the reel 3 are resiliently and mutually supported by one of the springs 7 which is located between the circular recess 3-2 formed in the middle of the reel 3 and the cylindrical member 2-1 which projects in the central part of an inside of the cover 2. Then, apart of a concave portion 3-1 formed in a bottom face of the reel 3 is outwardly protruded into a through-hole 1-1 opened in the central part of the case 1, and a bottomed cylindrical portion 4-1 of the pressing body 4 is engaged to the part of the concave portion 3-1, axially slidably and rotatably by a concavo-convex fitting. The other spring 7 is attached between an annular concave groove 1-2, which projects at an outer circumferential portion of the through-hole 1-1 opened in the central part of the case 1, and an annular concave groove (4-2) formed in the inside of the pressing body 4, and the pressing body 4 is resiliently supported in the axial direction. Then, the reel 3 and the pressing body 4 are integrally constructed by connecting the connection/abutment of each of the central parts of the reel 3 and the pressing body 4 with a connecting screw 6. In addition, the reason why there are two places for attaching the springs 7 for axially and resiliently supporting the pressing body 4, where are between the cover 2 and the reel 3 and between the case 1 and the pressing body 4, is because load to rotate/turn the pressing body 4 can be reduced in winding up the cord. That is to say, load of the spring 7 becomes heavy in order to stabilize feeding of the cord, and thus it gets heavy to rotate/turn the pressing body 4. Accordingly, two springs 7 are attached to the two places of top and bottom so that the load for winding up the cord can be reduced.

According to the rotary cutter for a mower having constitutions shown in the above-mentioned FIG. 6, in replacing a cord when it is worn out, the spring 7 and the cover 2 detachably engaged with the reel 3 are removed, and then a portion which is located in the central part of a long and new cord having a desired length, is fitted and placed to the concave grooves 5 for inserting a cord formed to the empty reel 3 which is engaged with the case 1 and to the concave grooves 8-1 on the cord guide 8 formed in the same straight line with this concave grooves 5 for inserting the cord from the top of these grooves, while making both ends of the cord respectively stick out from the cord guides only at a suitable length. In such conditions, a portion of the pressing body 4, which is connected to the reel 3 with the screw, is gripped and the reel is rotated manually so that the cord 9 can be wound to the reel 3.

In replacing a cord of the above-mentioned rotary cutter for a mower having the constitution shown in FIG. 6, there is little possibility of losing components of the rotary cutter, since only the cover 2 and the spring 7 have to be removed. Moreover, as described above, it is possible to insert and wind up the cord to the reel easily and quickly not only because the cord can be wound with the reel 3 fixed to the case 1 after inserting and fitting a new cord to concave grooves for inserting the cord which are formed in the reel, but also because load to rotate the pressing body 4 can be reduced by the effect of two springs 7 of top and bottom.

Figure 7:
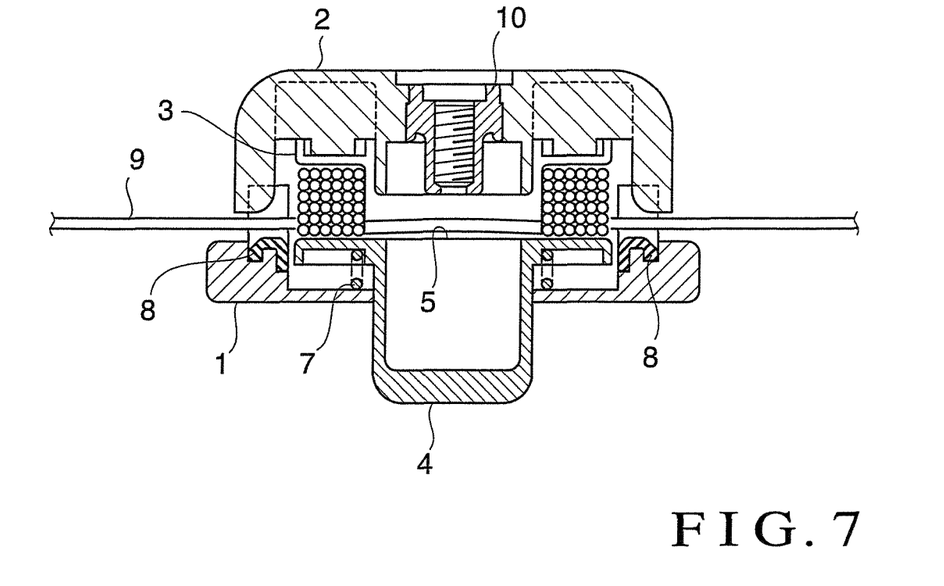
FIG. 7 is a vertical cross-sectional view of the fifth embodiment of the rotary cutter of the present invention, covered with a cover.

Reference is now made to the structure of the fifth embodiment of the rotary cutter for a mower of the present invention shown in FIG. 7. The structure of this rotary cutter is almost the same as that of the rotary cutter shown in FIG. 1 to FIG. 3, except that it has a structure that the position for attaching the spring 7, which is to axially and resiliently support the pressing body 4, is between the reel 3 and the case 1. The rotary cutter has a structure that a reel 3 constructed integrally with a pressing body 4 which has a bottomed cylindrical shape, is mounted in the middle of a case 1 so that the pressing body 4 projects downwardly of the case 1; and the case 1 and the reel 3 are resiliently and mutually supported by a spring 7 which is located between the reel 3 and the case 1.

In replacing a cord when it is worn out, the cover 2 detachably engaged with the reel 3 constructed integrally with the pressing body 4 which has a bottomed cylindrical shape, is removed, and then a portion which is located in the central part of a long and new cord having a desired length, is fitted and placed to the concave grooves 5 for inserting a cord formed to the empty reel 3 which is engaged with the case 1 and to the concave grooves 8-1 on the cord guide 8 formed in the same straight line with this concave grooves 5 for inserting the cord from the top of these grooves, while making both ends of the cord respectively stick out from the cord guides only at a suitable length. In such conditions, a portion of the pressing body 4 having a bottomed cylindrical shape, which is integrally constructed with the reel 3, is gripped and the reel 3 is outwardly pulled out against the spring 7 and then rotated manually so that the cord 9 can be wound to the reel 3. Moreover, feeding of the cord 9 can be achieved by manually gripping a portion of the pressing body 4 and outwardly pulling it out when the cord is worn out during operations.

In replacing a cord of the above-mentioned rotary cutter for a mower having the constitution shown in FIG. 7, there is no possibility of losing components of the rotary cutter, since, as described above, only the cover 2 has to be removed without the need to remove other components. Moreover, it is possible to insert and wind up the cord to the reel easily and quickly since the cord can be wound with the reel 3 fixed to the case 1 after inserting and fitting a new cord to concave grooves 5 for inserting the cord which are formed in the reel.

Figure 8:
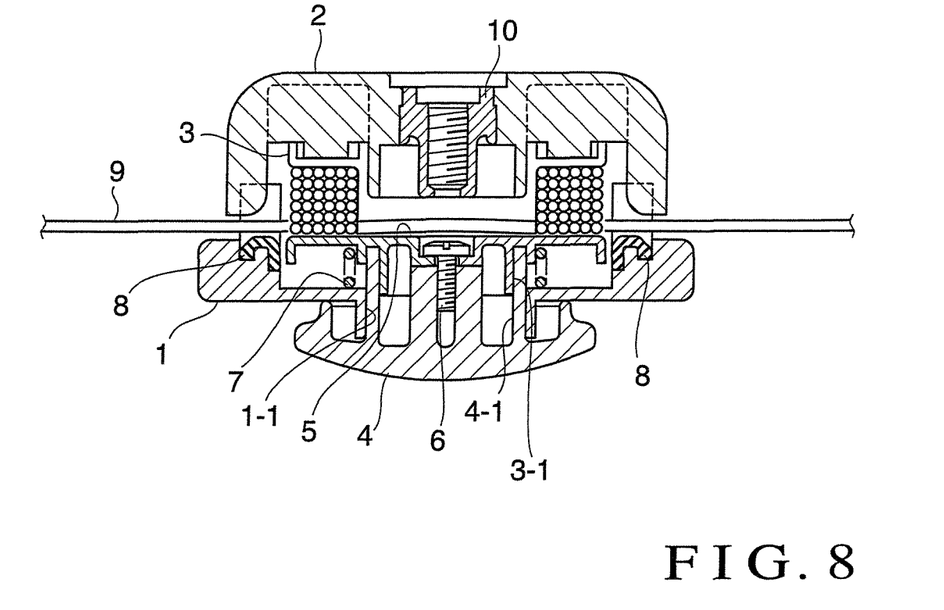
FIG. 8 is a vertical cross-sectional view of the sixth embodiment of the rotary cutter of the present invention, covered with a cover.

Reference is now made to the structure of the sixth embodiment of the rotary cutter for a mower of the present invention shown in FIG. 8. The structure of this rotary cutter is almost the same as that of the rotary cutter shown in FIG. 4, except that it has a structure that the position for attaching the spring 7, which is to axially and resiliently support the pressing body 4, is between the reel 3 and the case 1. In the sixth embodiment of the rotary cutter for a mower, a part of a concave portion 3-1 formed in a bottom face of the reel 3 is outwardly protruded into a through-hole 1-1 opened in the central part of the case 1, and a bottomed cylindrical portion 4-1 of the pressing body 4 is engaged to this part of the concave portion 3-1, axially slidably and rotatably by a concavo-convex fitting. In such a condition, the reel 3 and the pressing body 4 are integrally constructed by connecting the connection/abutment of each of the central parts of the reel 3 and the pressing body 4 with a connecting screw 6, and the pressing body 4 constructed integrally with the reel 3 is resiliently supported by attaching the spring 7 between the case 1 and the reel 3.

According to the rotary cutter for a mower having constitutions shown in the above-mentioned FIG. 8, in replacing a cord when it is worn out, like the rotary cutter of the above first embodiment, the cover 2 detachably engaged with the reel 3 is removed, and then a portion which is located in the central part of a long and new cord having a desired length, is fitted and placed to the concave grooves 5 for inserting a cord formed to the empty reel 3 which is engaged with the case 1 and to the concave grooves 8-1 on the cord guide 8 formed in the same straight line with this concave grooves 5 for inserting the cord from the top of these grooves, while making both ends of the cord respectively stick out from the cord guides only at a suitable length. In such conditions, a portion of the pressing body 4, which is connected to the reel 3 with the screw, is gripped and the reel is rotated manually so that the cord 9 can be wound to the reel 3.

In replacing a cord of the above-mentioned rotary cutter for a mower having the constitution shown in FIG. 8, there is no possibility of losing components of the rotary cutter, since, as described above, only the cover 2 has to be removed without the need to separately remove the case 1, the reel 3, the pressing body 4 and the spring 7. Moreover, it is possible to insert and wind up the cord to the reel easily and quickly since the cord can be wound with the reel 3 fixed to the case 1 after inserting and fitting a new cord to concave grooves 5 for inserting the cord which are formed in the reel 3.

Figure 9:
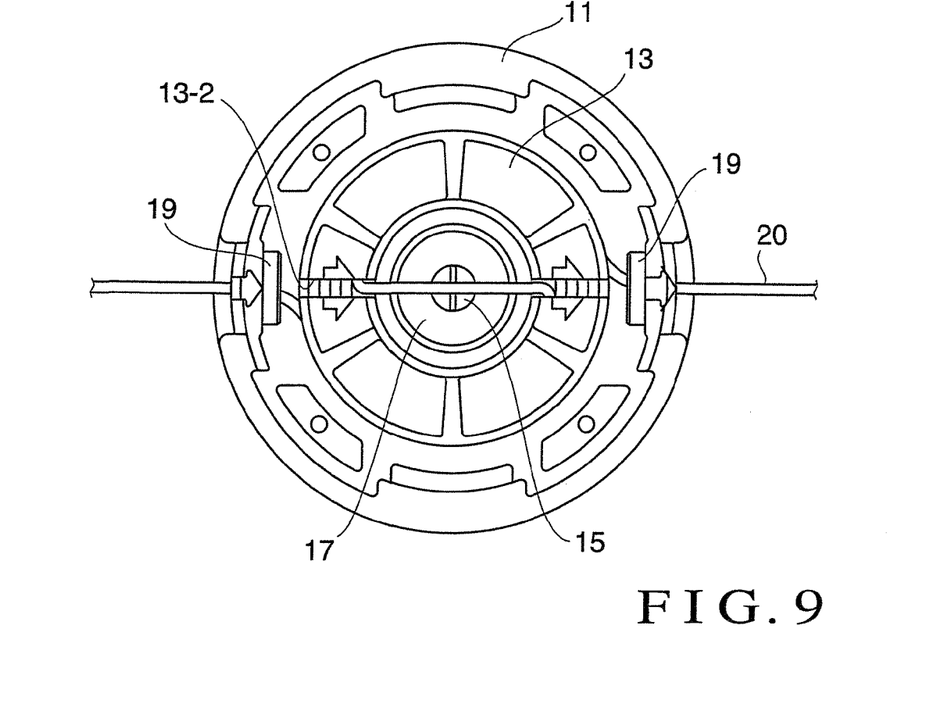
FIG. 9 is a top plane view of the rotary cutter with a cover removed.
Figure 10:
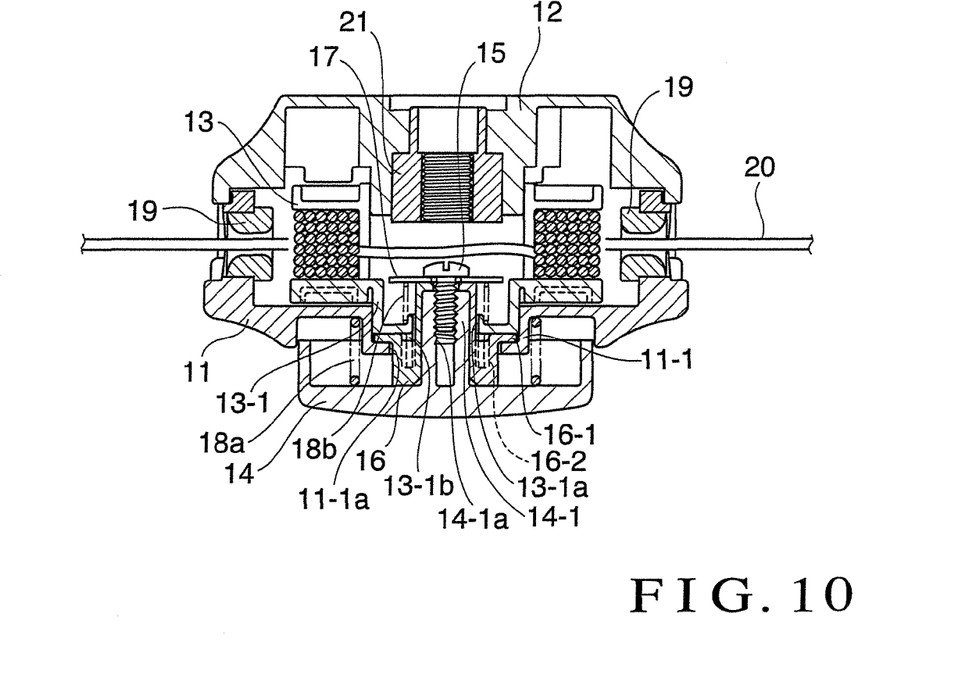
FIG. 10 is a vertical cross-sectional view of the rotary cutter covered with a cover.

Reference is now made to the structure of the seventh embodiment of the rotary cutter for a mower of the present invention shown in FIG. 9 to FIG. 10. In the seventh embodiment of the rotary cutter for a mower, the cord is fed by bumping the rotary cutter (a pressing body 4). This rotary cutter has a structure that, a part of a concave portion 13-1 formed in a bottom face of a reel 13 is engaged to a part of a concave portion 11-1 formed in the inner central part of a case 11, axially slidably and rotatably by a concavo-convex fitting; then, a circular pressing body 14 being concave in cross-section has a structure that a cylindrical retainer 16 is outwardly engaged to a coupling cylindrical portion 14-1 having a screw hole 14-1a which is provided in an extended condition in an inner central part of the pressing body 14, and the coupling cylindrical portion 14-1 with the retainer 16 of the pressing body 14 being concave in cross-section is rotatably penetrated through a through hole 11-1a provided in the central part of the concave portion 11-1 of the case 11 and a through hole 13-1a provided in the central part of the concave portion 13-1 of the reel 13; an engaging projection 13-1b, which is downwardly projected on the circumference of the central part of the bottom face of the concave portion 13-1 formed on the bottom face of the reel 13, is engaged with an engaging slot 16-2 formed in the retainer 16; the pressing body 14 is fixed to the case 11 by tightening the retainer 16 and the coupling cylindrical portion 14-1 having the screw hole 14-1a with a coupling screw 15 through/via a washer 17, in the state that a coupling flange 16-1 horizontally provided in an extended condition on the circumference of the lower part of the retainer 16 is sandwiched between the bottom face of the concave portion 11-1 of the case 11 and the bottom face of the concave portion 13-1 of the reel 13; the pressing body 14 is axially movable by a spring 18a which is located between the pressing body 14 and the case 11; and the reel 13 is axially movable and resiliently supported by a spring 18b which is located between the bottom face of the concave portion 13-1 of the reel 13 and the washer 17. In addition, as to the retainer 16 located between the pressing body 14 and the case 11, a retainer constructed separately from the pressing body 14 is used here, however, the retainer can also be constructed integrally with the pressing body 14.

Moreover, concave grooves 13-2 for inserting a cord are formed in a diametrical direction through the center of the reel onto the top side of the reel 13. The cord guides 19 are provided at a peripheral edge of the main body comprised of the case 11 and a cover 12 in the same straight line with this concave grooves 13-2 for inserting the cord. In addition, each of the cord guides 19 can be a ring-shaped one, and also have a concave groove in the middle having the same width as a concave groove 13-2 for inserting the cord (not shown). Reference number 21 stands for a nut member for connecting a drive rotary shaft (not shown) such as motors firmly fixed to the center of the cover 12.

The above rotary cutter for a mower has a structure that the case 11 and the reel 13, and the reel 13 and the cover 12 are respectively engaged by a concave-convex fitting, and the pressing body 14 is pushed inwardly by bumping the pressing body 14 against the ground. Accordingly, the engagement (mesh) between the case 11 and the reel 13 is uncoupled and then reel 13 rotates to feed a cord 20 wound on the reel 13 is fed (paid out). At the same time, the reel 13 pushed inwardly engages with the cover 12 and then a rotation once stops. Then the reel 13 returns to an original position by resilience of the spring 18a, and then engages with the case 11 again and fixed.

According to the rotary cutter for a mower having constitutions shown in the above-mentioned FIG. 9 to FIG. 10, in replacing the cord 20 when it is worn out, the cover 12 is removed and then a portion which is located in the central part of a long and new cord 20 having a desired length, is fitted and placed to the concave grooves 13-2 for inserting the cord formed to the empty reel 13 which is engaged with the case 11 and to the cord guide 19 formed in the same straight line with this concave grooves 13-2 for inserting the cord from the top of these grooves, while making both ends of the cord respectively stick out from the cord guides 19 only at a suitable length. In such conditions, a portion of the pressing body 14 constructed separately from the reel 13, is gripped and the reel 13 is rotated manually so that the cord 20 can be wound to the reel 13. In winding up this cord, the reel 13 moves up and down along the circumference of the retainer 16 through/via the spring 18b, by an engagement mechanism of a concave-convex fitting between the case 11 and the reel 13, and the reel 13 and the cover 12. However, it is possible to wind up the cord 20 easily and quickly since the pressing body 14 constructed separately from the reel 13 can be rotated without moving up and down. Moreover, it is possible to insert and wind up the cord 20 to the reel 13 easily and quickly since the cord can be wound with the reel 13 fixed to the case 1 after inserting and fitting a new cord to concave grooves 13-2 for inserting the cord which are formed in the reel. Furthermore, in replacing a cord, there is little possibility of losing components of the rotary cutter, since, as described above, only the cover 12 has to be removed without the need to remove other components.

Figure 11:
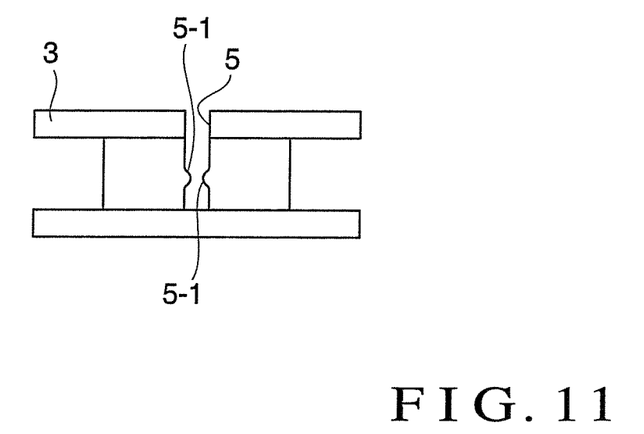
FIG. 11 is a schematic front view of a reel, showing an example of the structure of a part of a concave groove for inserting a cord of the rotary cutter of the present invention.
Figure 12:
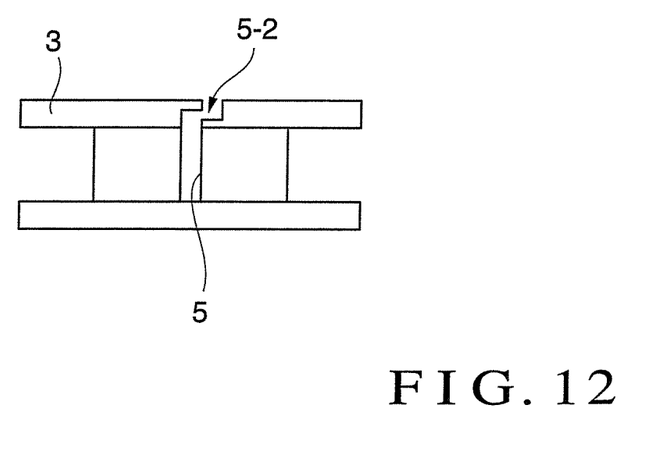
FIG. 12 is a schematic front view of a reel showing an example of a shape of an opening of a concave groove for inserting a cord.

Moreover, as for the concave grooves 5, 13-2 for inserting a cord in the rotary cutter for a mower shown in FIG. 1 to FIG. 10, it is possible to stably, quickly and positively wind up the cord when winding up the cord by, for example, providing projections 5-1 for preventing from uplifting the cord on the inner wall of the concave grooves 5 for inserting the cord as shown in FIG. 11, or, by forming a shape of openings of the concave grooves 5 for inserting the cord into a hook/aduncate shape 5-2 as shown in FIG. 12.

In addition, for cord guides 8 in a rotary cutter for a mower shown in FIG. 1 to FIG. 8, a cord guide having a grooved shape is shown, such as the one having a concave groove 8-1 which has the substantially same width as a concave groove 5 for inserting the cord. However, the cord guide is not limited to be in the shape of a grooved shape, but can also be in the shape of a tubular shape, as shown in FIG. 9 and FIG. 10.

According to a rotary cutter for a mower related to the present invention, in which the reel and the pressing body are integrally constructed, there is no possibility of losing associated components of a reel and other components when replacing a cord, and a concave-grooves fitting method has been adopted instead of a conventional insertion method as a cord-winding mechanism to the reel, thus the cord is wound by inserting and fitting itself to the concave grooves for inserting the cord provided in the reel. As a result, it is possible to easily and quickly insert the cord and also quickly and positively wind up the cord to the reel. In accordance with a further aspect, structurally, there is a small number of items of components, its production/processing is simple, and the production cost is inexpensive. Furthermore, it is possible to prevent the cord from uplifting/deviating from the reel and to stably and positively wind up the cord when winding up the cord to the reel, by providing projections for preventing from deviating the cord on the inner wall of the concave grooves for inserting the cord, or, by forming a shape of openings of the concave grooves for inserting the cord into a hook/aduncate shape.

According to a rotary cutter for a mower in which the reel and the pressing body are separately constructed, like the above-mentioned rotary cutter for a mower, there is no possibility of losing associated components of a reel and other components when replacing a cord, and structurally there is a small number of items of components, so its production/processing is simple, and the production cost is inexpensive. Furthermore, especially when replacing a cord, it is possible to wind up the cord to the reel easily, quickly and positively, since the pressing body can be rotated without moving up and down. Still further, like the above-mentioned rotary cutter for a mower, it is possible to insert the cord easily and quickly to the reel by the addition of an advantageous effect of concave grooves for inserting the cord.

Hence, the rotary cutter for a mower claimed in the present invention has a tremendous practical application as a bush cutter for cutting lawn or weed.

The invention claimed is:

1. A rotary cutter for a mower, comprising
a cord for cutting grass by rotating itself;
a reel for housing the cord and feeding the cord while intermittently rotating, the reel having opposite first and second longitudinal ends and a concave groove aligned diametrically and extending into the reel from the first end toward the second end, the concave groove being dimensioned for receiving the cord;
a case for housing at least the second end of the reel, the case having an annular concavity facing away from the reel;
a cover for covering the case and the first end of the reel; and
a pressing body protruding from a side of the case opposite the reel, the reel being axially movable and intermittently rotating by being pressed as the pressing body is pressed, the pressing body having an annular concavity facing toward the case; wherein
the reel and the pressing body are separately constructed; the cord is wound by fitting the cord into the concave groove and rotating the reel;
the pressing body is mounted detachably on the case;
a first spring being disposed in the annular concavities between the case and the pressing body for outwardly biasing the pressing body and a second spring disposed for biasing the reel toward the case, the springs are axially mounted in the rotary cutter;
the reel and the pressing body are separately and resiliently-supported, respectively.

2. The rotary cutter for a mower according to claim 1, including a retainer for detachably holding the pressing body on the case.

3. The rotary cutter for a mower according to claim 2, wherein
the retainer is integral with or separate from the pressing body.

4. The rotary cutter for a mower according to claim 1, wherein the reel has a cylindrical wall extending substantially from the first end to the second and of the reel, first and second flanges extending out from the respective first and second ends of the cylindrical wall so that a cord winding space is defined outward of the cylindrical wall and between the flanges, the concave groove extending diametrically across the cylindrical wall and the first flange at the first end of the reel.

5. The rotary cutter for a mower according to claim 1, wherein the reel is configured to reciprocate axially relative to the pressing body in response to rotation of the pressing body.

* * * * *